(12) United States Patent
Brizius

(10) Patent No.: US 9,051,479 B2
(45) Date of Patent: Jun. 9, 2015

(54) PAINTS AND COATINGS CONTAINING CYCLODEXTRIN ADDITIVES

(71) Applicant: EMPIRE TECHNOLOGY DEVELOPMENT LLC, Wilmington, DE (US)

(72) Inventor: Glen Leon Brizius, Augusta, GA (US)

(73) Assignee: Empire Technology Development LLC, Wilmington, DE (US)

( * ) Notice: Subject to any disclaimer, the term of this patent is extended or adjusted under 35 U.S.C. 154(b) by 20 days.

(21) Appl. No.: 13/879,941

(22) PCT Filed: Oct. 12, 2012

(86) PCT No.: PCT/US2012/060046
§ 371 (c)(1),
(2) Date: Apr. 17, 2013

(87) PCT Pub. No.: WO2014/058438
PCT Pub. Date: Apr. 17, 2014

(65) Prior Publication Data
US 2014/0200290 A1    Jul. 17, 2014

(51) Int. Cl.
| | | |
|---|---|---|
| C08B 37/16 | (2006.01) | |
| C09D 7/12 | (2006.01) | |
| C08L 5/16 | (2006.01) | |
| C09D 5/16 | (2006.01) | |
| C09D 105/16 | (2006.01) | |
| C08K 3/22 | (2006.01) | |

(52) U.S. Cl.
CPC . *C09D 7/125* (2013.01); *C08L 5/16* (2013.01); *C08B 37/0012* (2013.01); *C09D 5/16* (2013.01); *C09D 105/16* (2013.01); *C08K 2003/2251* (2013.01)

(58) Field of Classification Search
CPC .............................. C08L 5/16; C08B 37/0012
USPC ......................................................... 536/103
See application file for complete search history.

(56) References Cited

U.S. PATENT DOCUMENTS

| | | | |
|---|---|---|---|
| 4,917,956 A | 4/1990 | Rohrbach | |
| 5,098,793 A | 3/1992 | Rohrbach et al. | |
| 5,177,129 A * | 1/1993 | Bobo, Jr. ........................ | 524/48 |

(Continued)

FOREIGN PATENT DOCUMENTS

| | | |
|---|---|---|
| EP | 0454910 A1 | 11/1991 |
| EP | 0460896 B1 | 12/1991 |

(Continued)

OTHER PUBLICATIONS

Badi et al., Journal of Molecular Catalysis A: Chemical 318 (2010) 8-14.*

(Continued)

*Primary Examiner* — Liam J Heincer
(74) *Attorney, Agent, or Firm* — Pepper Hamilton LLP

(57) ABSTRACT

Hydrophilic coating compositions and methods to make and use the compositions are disclosed. The coatings include one or more amphiphilic cyclodextrins, with one or more hydrophilic groups in place of primary hydroxyl groups, and one or more hydrophobic groups in place of secondary hydroxyl groups. The hydrophobic surface of the cyclodextrin faces the binder particles, while the hydrophilic surface is exposed to the exterior, thus providing a hydrophilic and self-cleaning property to the coating.

15 Claims, 1 Drawing Sheet

(56) References Cited

U.S. PATENT DOCUMENTS

| | | | |
|---|---|---|---|
| 5,587,466 A * | 12/1996 | Vieil et al. | 536/4.1 |
| 5,594,125 A * | 1/1997 | Seyschab et al. | 536/103 |
| 5,608,052 A * | 3/1997 | Zmitek et al. | 536/103 |
| 5,633,368 A | 5/1997 | Hirsenkorn | |
| 5,760,015 A | 6/1998 | Joullié | |
| 5,760,017 A * | 6/1998 | Djedaini-Pilard et al. | 514/58 |
| 5,854,225 A * | 12/1998 | Richard et al. | 514/58 |
| 5,935,941 A | 8/1999 | Pitha | |
| 6,858,723 B1 * | 2/2005 | Auzely-Velty et al. | 536/46 |
| 6,881,248 B2 | 4/2005 | Lee et al. | |
| 7,812,152 B2 * | 10/2010 | Perly et al. | 536/55 |
| 7,851,457 B2 | 12/2010 | Hecht et al. | |
| 2002/0132861 A1 * | 9/2002 | Uchiyama et al. | 516/198 |
| 2003/0092672 A1 * | 5/2003 | Darcy et al. | 514/54 |
| 2003/0144222 A1 * | 7/2003 | Wang et al. | 514/44 |
| 2003/0152602 A1 * | 8/2003 | Perrier et al. | 424/401 |
| 2007/0015729 A1 * | 1/2007 | Geckeler et al. | 514/58 |
| 2007/0142324 A1 * | 6/2007 | Perly et al. | 514/58 |
| 2007/0237738 A1 | 10/2007 | Hanzlicek et al. | |
| 2007/0264520 A1 * | 11/2007 | Wood et al. | 428/606 |
| 2008/0032110 A1 * | 2/2008 | Wood et al. | 428/220 |
| 2009/0281214 A1 * | 11/2009 | Kwak et al. | 524/48 |
| 2010/0093662 A1 * | 4/2010 | Defaye et al. | 514/58 |
| 2010/0280133 A1 | 11/2010 | Regiert et al. | |
| 2011/0124103 A1 * | 5/2011 | Darcy et al. | 435/325 |
| 2013/0184453 A1 * | 7/2013 | Davis et al. | 536/103 |
| 2013/0288054 A1 * | 10/2013 | Pipkin et al. | 428/402 |

FOREIGN PATENT DOCUMENTS

| | | |
|---|---|---|
| EP | 0614950 B1 | 11/1996 |
| WO | WO2005/080512 A1 | 9/2005 |
| WO | WO2010/000869 A1 | 1/2010 |

OTHER PUBLICATIONS

International Search Report and Written Opinion for PCT/US2012/060046 dated Mar. 1, 2013.

Benedix et al., Application of Titanium Dioxide Photocatalysis to Create Self-Cleaning Building Materials, *LACER* (2000), 5:157:168.

Breitenkamp et al., Aggregation of Poly(*p*-phenylene ethynylene)s Containing Nonpolar and Amine Side Chains, *Macromolecules* (Jan. 16, 2004), 37(3):1163-1165 (Abstract).

Calabretta et al., Antibacterial Activities of Poly(amidoamine) Dendrimers Terminated with amino and Poly(ethylene glycol) Groups, *Biomacromolecules* (May 19, 2007), 8(6):1807-1811 (Abstract).

Chalking Paint: Learn the causes and remedies for chalking paint, http://www.house-painting-info.com/chalking-paint.html (Printed from Internet Mar. 15, 2013).

Clark et al., Synthesis and Self-Assembly of an Amphiphilic Poly(phenylene ethynylene Ionomer, *J. Phys. Chem. B.* (Aug. 11, 2006), 110(44):22088-22096 (Abstract).

Hydrophilic vs. hydrophobic. The meaning of contact angle, SuperHydroPhobic Coating, http://superhydrophobiccoating.com/hydrophilic-hydrophobic-8/ (Printed from Internet Mar.15, 2013).

Iranpoor et al., Easily Prepared Azopyridines As Potent and Recyclable Reagents for Facile Esterification Reactions. An Efficient Modified Mitsunobu Reaction, *J. Org. Chem.* (May 31, 2008), 73(13):4882-4887 (Abstract).

Kim et al., Control of conformational and interpolymer effects in conjugated polymers, *Nature* (Jun. 28, 2001), 411:1030-1034 (Abstract).

Kim et al., Structural Control in Thin Layers of Poly(*p*-phenyleneethynylene)s: Photophysical Studies of Langmuir and Langmuir-Blodgett Films, *J. Am. Chem. Soc.* (Jun. 8, 2002), 124(26):7710-7718 (Abstract).

Li et al., Light-Switchable Janus [2]Rotaxanes Based on α-Cyclodextrin Derivatives Bearing Two Recognition Sites Linked with Oligo(ethylene glycol), *Chemistry—An Asian Journal* (Jul. 28, 2010), 5(10):2281-2289 (Abstract).

Menzel, Ozone: An overview of its toxicity in man and animals, *Journal of toxicology and Environmental Health* (Oct. 20, 2009), 13(2-3):181-204 (Abstract).

Mitsunobu Reaction, http://www.organic-chemistry.org/namedreactions/mitsunobu-reaction.shtm (Printed from Internet Mar. 15, 2013).

Osburn, A Literature Review on the Application of Titanium Dioxide Reactive Surfaces on Urban Infrastructure for Depolluting and Self-Cleaning Applications, http://www.cib2007.com/papers/CIDB2008%20Final%20paper%20No23.pdf (Printed from Internet Mar. 15, 2013), pp. 1-15.

Recently Modified Mitsunobu Reactions, TCI Product Literature, R-5044E (Mar. 2007), pp. 1-6.

Self-Cleaning Paint Uses Light to Cleanse Walls, Environmental News Service, http://www.ens-newswire.com/ens/apr2008/2008-04-27-093.html (Apr. 27, 2008).

Zhang et al., First Per-6-*O*-tritylation of Cyclodextrins, *Org. Lett.* (Mar. 6, 2012), 14(6):1612-1615 (Abstract).

Lange, Handbook of Chemistry, Revised 10$^{th}$ Ed. (1967), pp. 1660-1665.

* cited by examiner

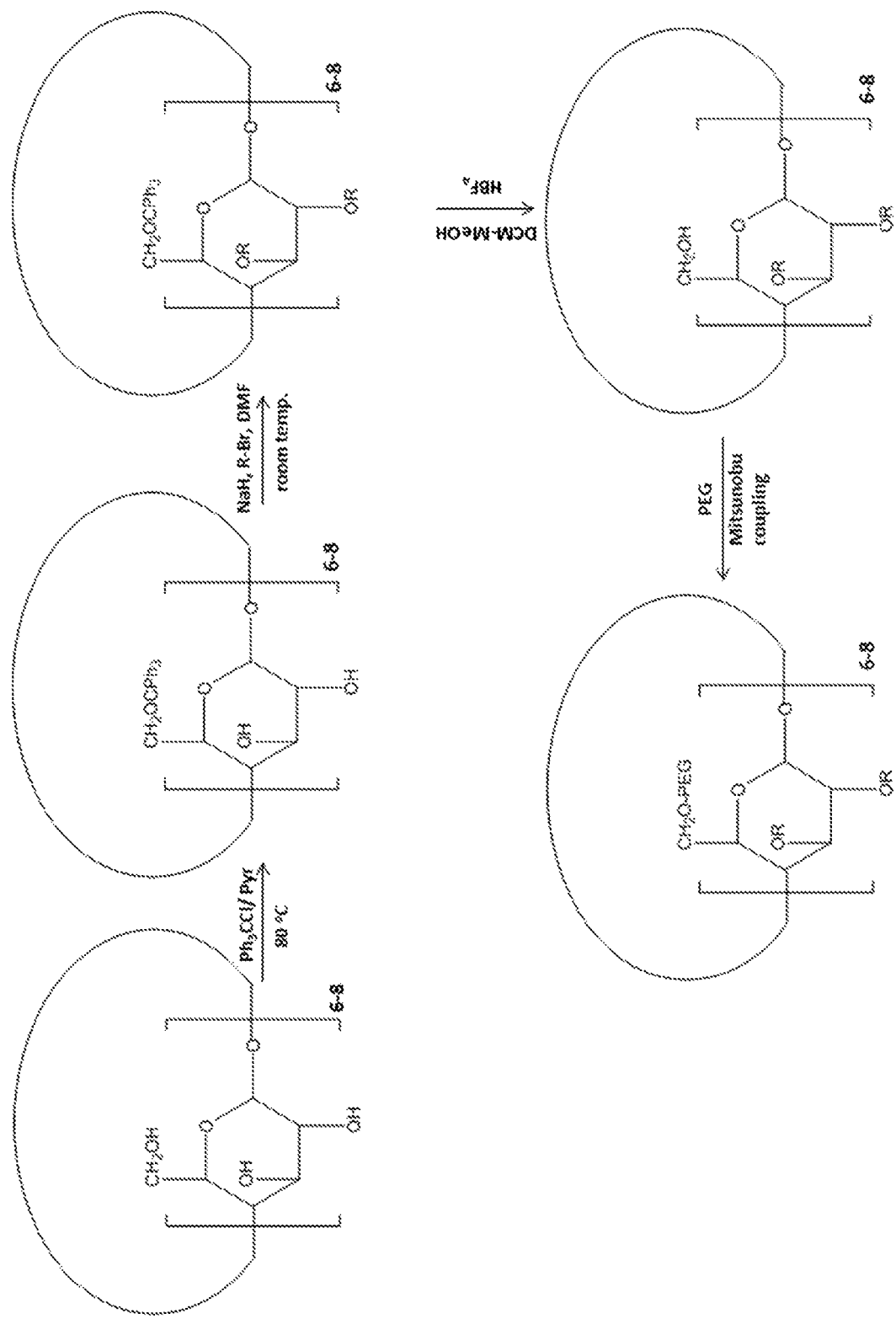

PAINTS AND COATINGS CONTAINING CYCLODEXTRIN ADDITIVES

CLAIM OF PRIORITY

This application is a U.S. national stage filing under 35 U.S.C. §371 of International Application No. PCT/US2012/060046 filed on Oct. 12, 2012 entitled "Paints and Coatings Containing Cyclodextrin Additives", which is incorporated herein by reference.

BACKGROUND

Coatings and paints are routinely used to beautify and protect substrates. The most simple coatings and paints are made of a polymer (the binder) in a solvent (the vehicle), which is commonly called a lacquer. Paints and coatings modify the appearance of an object by adding color, gloss, or texture, and by blending with or differentiating from a surrounding environment. For example, a surface that is highly light scattering can be made glossy by the application of a paint that has a high gloss. Conversely, a glossy surface can be made to appear flat. Thus, the painted surface is hidden, altered, and ultimately changed in some manner by the presence of the coating. In addition, paints also protect the surface from the surrounding elements and prevent or reduce the corrosive process.

Paints and coatings, while protecting the substrate from external environment, can themselves get dirty over time. The dirt can dull the coating by increasing the light scattering or by modifying the color of the coating. Dirt can also affect a paint's durability. Thus, it is desirable to have coatings with a hydrophilic surface and self-cleaning properties. A hydrophilic surface would allow water to spread out in a thin layer, sweeping dirt off the surface as the water thins out and trickles away. This type of "self-cleaning" behavior is advantageous to an exterior paint, as it keeps the coating clean without requiring extensive cleaning by the customer. A hydrophilic surface would allow water to sheathe over the surface and either solvate or even carry away the dirt molecules.

SUMMARY

The current disclosure is directed to paints and coatings with hydrophilic and self-cleaning properties. In one embodiment, a cyclodextrin compound is of formula I:

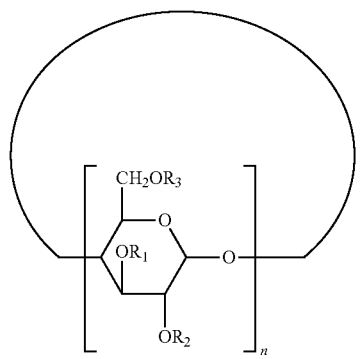

wherein each $R_1$ and each $R_2$ is, independently, H or a hydrophobic group, wherein at least one $R_1$ and at least one $R_2$ is a hydrophobic group; wherein each $R_3$ is independently, a hydrophilic group or H, wherein at least one $R_3$ is a hydrophilic group; and n is 6, 7, or 8.

In another embodiment, the cyclodextrin compound is of formula I:

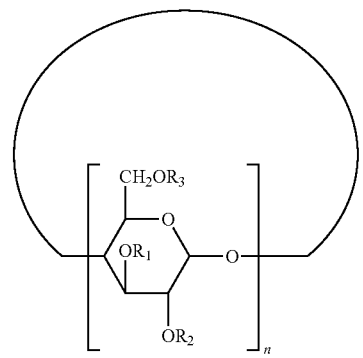

wherein each $R_1$ and each $R_2$ is, independently, H or a hydrophilic group, and at least one $R_1$ and at least one $R_2$ is a hydrophilic group; each $R_3$ is independently, a hydrophobic group or H, wherein at least one $R_3$ is a hydrophobic group; and n is 6, 7, or 8.

In an additional embodiment, a method of making a cyclodextrin compound includes: (a) replacing a hydrogen atom of at least one primary hydroxyl group of cyclodextrin with a sterically bulky moiety to form a first protected cyclodextrin; (b) replacing a hydrogen atom of at least one secondary hydroxyl group of the first protected cyclodextrin with a hydrophobic group to form a second protected cyclodextrin; (c) removing at least one sterically bulky moiety from the second protected cyclodextrin to form a cyclodextrin having hydrophobic groups and free primary hydroxyl groups; and (d) replacing a hydrogen atom of at least one primary hydroxyl group of the cyclodextrin having hydrophobic groups with a hydrophilic group to form the cyclodextrin compound.

In a further embodiment, a hydrophilic coating composition may include a coating additive, wherein the additive is at least one cyclodextrin compound having the formula I:

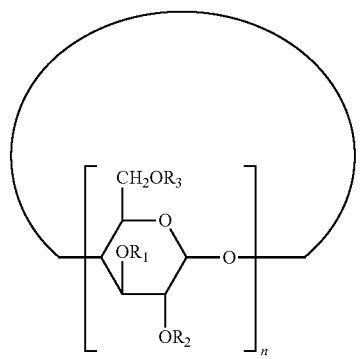

wherein each R1 and each R2 is, independently, H or a hydrophobic group, and at least one R1 and at least one R2 is a hydrophobic group; each R3 is, independently, a hydrophilic group or H, wherein at least one R3 is a hydrophilic group; and n is 6, 7, or 8.

In another embodiment, a method of coating a substrate may involve applying a coating composition to the substrate, wherein the coating composition includes at least one cyclodextrin compound of formula I

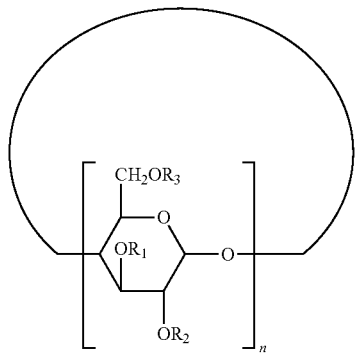

wherein each $R_1$ and each $R_2$ is, independently, H or a hydrophobic group, and at least one $R_1$ and at least one $R_2$ is a hydrophobic group; each $R_3$ is, independently, a hydrophilic group or H, wherein at least one $R_3$ is a hydrophilic group; and n is 6, 7, or 8.

BRIEF DESCRIPTION OF THE FIGURE

FIG. 1 illustrates the preparation of an amphiphilic cyclodextrin according to an embodiment.

DETAILED DESCRIPTION

This disclosure is not limited to the particular systems, devices and methods described, as these may vary. The terminology used in the description is for the purpose of describing the particular versions or embodiments only, and is not intended to limit the scope.

"Amphiphilic" means a three-dimensional structure having discrete hydrophobic and hydrophilic regions. An amphiphilic compound has the presence of both hydrophobic and hydrophilic elements.

"Alkyl" refers to monovalent saturated aliphatic hydrocarbyl groups having from 1 to 24 carbon atoms or 1 to 10 carbon atoms. This term includes, by way of example, linear and branched hydrocarbyl groups such as methyl (—$CH_3$), ethyl (—$CH_2CH_3$), n-propyl (—$CH_2CH_2CH_3$), isopropyl (($CH_3)_2$CH—), n-butyl ($CH_3CH_2CH_2CH_2$—), isobutyl (($CH_3)_2$CHCH_2—), sec-butyl (($CH_3$)($CH_3CH_2$)CH—), and t-butyl (($CH_3)_3$C—).

"Alkenyl" means a straight or branched alkyl group having one or more double carbon-carbon bonds and 2-24 carbon atoms, including, but not limited to, ethenyl, 1-propenyl, 2-propenyl, 2-methyl-1-propenyl, 1-butenyl, 2-butenyl, and the like. In some embodiments, the alkenyl chain is 2 to 10 carbon atoms in length, 2 to 8 carbon atoms in length, 2 to 6 carbon atoms in length, or 2 to 4 carbon atoms in length.

"Alkynyl" refers to a straight or branched alkyl group having one or more triple carbon-carbon bonds and 2-20 carbon atoms, including, but not limited to, acetylene, 1-propylene, 2-propylene, and the like. In some embodiments, the alkynyl chain is 2 to 10 carbon atoms in length, 2 to 8 carbon atoms in length, 2 to 6 carbon atoms in length, or 2 to 4 carbon atoms in length.

"Aryl" refers to an aromatic carbocyclic group from 5 to 14 carbon atoms having a single ring (e.g., benzo) or multiple condensed rings (e.g., naphthyl, biphenyl or anthryl) which condensed rings may or may not be aromatic.

"Haloalkyl" refers to alkyl groups in which one or more hydrogen atoms are replaced by one or more chlorine, fluorine, bromine, iodine atoms, or any combination thereof.

"Cycloalkyl" refers to non-aromatic cyclic hydrocarbons including cyclized alkyl, alkenyl, and alkynyl groups that contain up to 20 ring-forming carbon atoms. Cycloalkyl groups can include mono- or polycyclic ring systems such as fused ring systems, bridged ring systems, and spiro ring systems. In some embodiments, polycyclic ring systems include 2, 3, or 4 fused rings. A cycloalkyl group can contain 3 to 15, 3 to 10, 3 to 8, 3 to 6, 4 to 6, 3 to 5, or 5 or 6 ring-forming carbon atoms. Ring-forming carbon atoms of a cycloalkyl group can be optionally substituted by oxo or sulfido. Examples of cycloalkyl groups include, but are not limited to, cyclopropyl, cyclobutyl, cyclopentyl, cyclohexyl, cycloheptyl, cyclooctyl, cyclononyl, cyclopentenyl, cyclohexenyl, cyclohexadienyl, cycloheptatrienyl, norbornyl, norpinyl, norcarnyl, adamantyl, and the like.

As paints and coatings become covered and contaminated with unwanted substances, the appearance of the object often changes in undesirable ways. It is often expensive, time consuming, and sometimes hazardous to clean the coated surface, and the detergents, surfactants, fragrances, alkali, lime, and/or other chemicals used to clean the surface make their way into the environment where they can potentially cause damage. Thus, it is desirable to have a coating with a hydrophilic surface that keeps dirt from sticking to the surface, is self-cleaning, and contains environmental friendly chemicals.

Cyclodextrins are a group of cyclic oligosaccharides in which glucopyranosyl residues are joined by alpha (1 to 4) glycoside linkages. Three attractive cyclodextrins are alpha, beta and gamma cyclodextrins, which have, respectively, six, seven and eight glucopyranosyl residues. Topographically, the cyclodextrins may be represented as a torus, the upper rim of which is lined with primary hydroxyl groups, and the lower rim with secondary hydroxyl groups. Coaxially aligned with the torus is a channel-like cavity of about 5, 6 or 7.5 angstrom units in diameter for the alpha, beta and gamma cyclodextrins, respectively. Since each of the glucopyranosyl residues has two secondary hydroxyl groups and one primary hydroxyl group, the alpha, beta and gamma cyclodextrins have, respectively, 18, 21 or 24 hydroxyl groups that can be modified.

In some embodiments, the cyclodextrin can be of formula I:

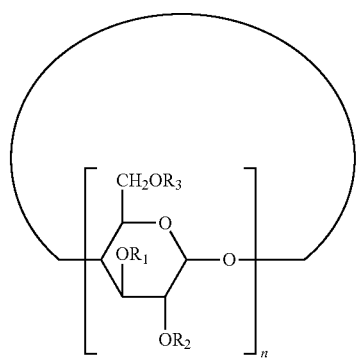

wherein each $R_1$ and each $R_2$ is, independently, H or a hydrophobic group, and at least one $R_1$ and at least one $R_2$ is a hydrophobic group; each $R_3$ is, independently, a hydrophilic group or H, wherein at least one $R_3$ is a hydrophilic group; and n is 6, 7, or 8.

Examples of hydrophilic groups include, but are not limited to, polyethylene glycol, amine, amide, epoxide, lactone, carboxyl, or carbonyl. The polyethylene glycol may be methyl-capped and is represented by the formula $CH_3(OCH_2CH_2)_n$—, wherein n is an integer of 2 to 24. The hydrophobic groups that are attached to the cyclodextrin may be, but are not limited to, alkyl, alkenyl, alkynyl, haloalkyl, cycloalkyl, or aryl groups. The presence of hydrophilic groups on the upper rim and the hydrophobic groups on the lower rim creates an amphiphilic cyclodextrin molecule.

In some embodiments, the cyclodextrin is of formula I:

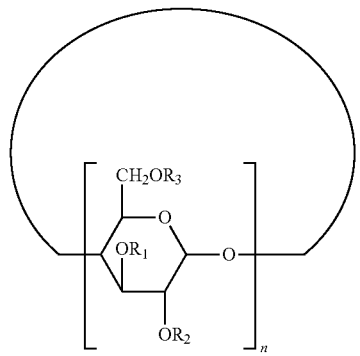

I wherein each $R_1$ and each $R_2$ is, independently, H or a hydrophilic group, and at least one $R_1$ and at least one $R_2$ is a hydrophilic group; wherein each $R_3$ is, independently, a hydrophobic group or H, wherein at least one $R_3$ is a hydrophobic group; and n is 6, 7, or 8.

In some embodiments, the alpha cyclodextrin may have the following substitutions: $R_1$ is —$(CH_2)_{20}$—$CH_3$, $R_2$ is —$(CH_2)_{20}$—$CH_3$, and $R_3$ is $CH_3(OCH_2CH_2)_{10}$—; $R_1$ is alkyl, $R_2$ is alkyl, and $R_3$ is amine; $R_1$ is alkyl, $R_2$ is alkyl, and $R_3$ is epoxide; $R_1$ is alkyl, $R_2$ is cycloalkyl, and $R_3$ is lactone; $R_1$ is alkyl, $R_2$ is cycloalkyl, and $R_3$ is a carboxyl group; $R_1$ is alkyl, $R_2$ is cycloalkyl, and $R_3$ is $CH_3(OCH_2CH_2)_{20}$—; $R_1$ is haloalkyl, $R_2$ is cycloalkyl, and $R_3$ is $CH_3(OCH_2CH_2)_{20}$—; $R_1$ is haloalkyl, $R_2$ is haloalkyl, and $R_3$ is $CH_3(OCH_2CH_2)_{20}$—; $R_1$ is $CH_3(OCH_2CH_2)_{10}$—, $R_2$ is $CH_3(OCH_2CH_2)_{10}$—, and $R_3$ is —$(CH_2)_{20}$—$CH_3$ or $R_1$ is $CH_3(OCH_2CH_2)_{20}$—, $R_2$ is $CH_3(OCH_2CH_2)_{20}$—, and $R_3$ is —$(CH_2)_{20}$—$CH_3$.

In some embodiments, the beta cyclodextrin may have the following substitutions: $R_1$ is —$(CH_2)_{20}$—$CH_3$, $R_2$ is —$(CH_2)_{20}$—$CH_3$, and $R_3$ is $CH_3(OCH_2CH_2)_{10}$—; $R_1$ is alkyl, $R_2$ is alkyl, and $R_3$ is amine; $R_1$ is alkyl, $R_2$ is alkyl, and $R_3$ is epoxide; $R_1$ is alkyl, $R_2$ is cycloalkyl, and $R_3$ is lactone; $R_1$ is alkyl, $R_2$ is cycloalkyl, and $R_3$ is a carboxyl group; $R_1$ is alkyl, $R_2$ is cycloalkyl, and $R_3$ is $CH_3(OCH_2CH_2)_{20}$—; $R_1$ is haloalkyl, $R_2$ is cycloalkyl, and $R_3$ is $CH_3(OCH_2CH_2)_{20}$—; $R_1$ is haloalkyl, $R_2$ is haloalkyl, and $R_3$ is $CH_3(OCH_2CH_2)_{20}$—; $R_1$ is $CH_3(OCH_2CH_2)_{10}$—, $R_2$ is $CH_3(OCH_2CH_2)_{10}$—, and $R_3$ is —$(CH_2)_{20}$—$CH_3$ or $R_1$ is $CH_3(OCH_2CH_2)_{20}$—, $R_2$ is $CH_3(OCH_2CH_2)_{20}$—, and $R_3$ is —$(CH_2)_{20}$—$CH_3$.

In some embodiments, the gamma cyclodextrin may have the following substitutions: $R_1$ is —$(CH_2)_{20}$—$CH_3$, $R_2$ is —$(CH_2)_{20}$—$CH_3$, and $R_3$ is $CH_3(OCH_2CH_2)_{10}$—; $R_1$ is alkyl, $R_2$ is alkyl, and $R_3$ is amine; $R_1$ is alkyl, $R_2$ is alkyl, and $R_3$ is epoxide; $R_1$ is alkyl, $R_2$ is cycloalkyl, and $R_3$ is lactone; $R_1$ is alkyl, $R_2$ is cycloalkyl, and $R_3$ is a carboxyl group; $R_1$ is alkyl, $R_2$ is cycloalkyl, and $R_3$ is $CH_3(OCH_2CH_2)_{20}$—; $R_1$ is haloalkyl, $R_2$ is cycloalkyl, and $R_3$ is $CH_3(OCH_2CH_2)_{20}$—; $R_1$ is haloalkyl, $R_2$ is haloalkyl, and $R_3$ is $CH_3(OCH_2CH_2)_{20}$—; $R_1$ is $CH_3(OCH_2CH_2)_{10}$—, $R_2$ is $CH_3(OCH_2CH_2)_{10}$—, and $R_3$ is —$(CH_2)_{20}$—$CH_3$ or $R_1$ is $CH_3(OCH_2CH_2)_{20}$—, $R_2$ is $CH_3(OCH_2CH_2)_{20}$—, and $R_3$ is —$(CH_2)_{20}$—$CH_3$.

In some embodiments, a method of making a cyclodextrin compound may involve: (a) replacing a hydrogen atom of at least one primary hydroxyl group of cyclodextrin with a sterically bulky moiety to form a first protected cyclodextrin; (b) replacing a hydrogen atom of at least one secondary hydroxyl group of the first protected cyclodextrin with a hydrophobic group to form a second protected cyclodextrin; (c) removing at least one sterically bulky moiety from the second protected cyclodextrin to form a cyclodextrin having hydrophobic groups and free primary hydroxyl groups; and (d) replacing a hydrogen atom of at least one primary hydroxyl group of the cyclodextrin having hydrophobic groups with a hydrophilic group to form the cyclodextrin compound. Representative reaction steps are outlined in FIG. 1.

The first step of the reaction can include protecting one or more primary hydroxyl groups of the cyclodextrin with a sterically bulky moiety to form a first protected cyclodextrin. This may be performed by contacting the cyclodextrin with a sterically bulky moiety in the presence of a base. Cyclodextrins used for this modification may be alpha, beta or gamma cyclodextrins. Further, a number of sterically bulky moieties, such as trityl, tert-butyldimethylsilyl, trimethylsilyl, triisopropylsilyl, or tosyl groups may be used in this step. Examples of trityl groups that may be used are trityl halide, dimethoxy trityl halide, and methoxy trityl halide. The base catalyst may be a pyridine or any non-nucleophilic amine. This reaction step may be performed at a temperature of about 70° C. to about 90° C., of about 70° C. to about 85° C., of about 70° C. to about 80° C., or of about 70° C. to about 75° C. Examples of specific temperatures also include about 70° C., about 75° C., about 80° C., about 85° C., about 90° C., and ranges between any two of these values (and including the endpoints). One purpose of blocking the primary hydroxyl groups is to protect these groups from the subsequent reaction with the alkyl halides, thus forcing the alkyl halides to react with secondary alcohol groups and not the primary alcohols.

Another step of the reaction can include replacing one or more hydrogen atoms of at least one secondary alcohol group of the first protected cyclodextrin. This reaction may be performed by contacting the first protected cyclodextrin with any of the following: an alkyl halide, a tosylate or a mesylate, in the presence of an alkali metal hydride or an alkaline earth metal hydride. Examples of alkali metal hydrides include sodium hydride, potassium hydride, lithium hydride and the like. Examples of alkaline earth metal hydride include, but are not limited to, magnesium hydride and calcium hydride. The alkyl halide used in the reaction may be an alkyl bromide, an alkyl chloride, an alkyl iodide or an alkyl fluoride, with the length of C atoms from 2 to 24. This reaction may be performed at room temperature for about 30 minutes to about 4 hours, for about 30 minutes to about 2 hours, or for about 30 minutes to about 1 hour. Specific examples of times also include about 30 minutes, about 1 hour, about 1.5 hours, about 2 hours, about 3 hours, about 4 hours, and ranges between any two of these values (including the end points). This reaction results in the formation of a second protected cyclodextrin, with one or more sterically bulky moieties replacing one or more primary hydroxyl groups, and one or more alkyl groups in the place of secondary hydroxyl groups.

Another step can include removing at least one sterically bulky moiety. This may be performed by reacting the cyclodextrin obtained from the previously mentioned step with an acid, such as fluoroboric acid or trifluoroacetic acid. A solvent mixture of any of the following may be used in this step: dichloromethane, ethyl acetate, chloroform, dimethyl-formamide, propanol, ethanol, butanol, methanol or combinations thereof. This reaction results in formation of one or more free primary hydroxyl groups, which can be replaced with one or more hydrophobic groups.

Another step of the reaction can include replacing one or more of the primary hydroxyl groups of the cyclodextrin obtained from the previous step, with one or more hydrophilic groups. This step may be carried out by, for example, a Mitsunobu coupling reaction, which is well known in the art. Typically, the Mitsunobu reaction involves conversion of one or more of the hydroxyl groups into a potent leaving group that is able to be displaced by a wide variety of nucleophiles. In addition, a modified Mitsunobu reaction may also be used, as this helps in simplifying the separation of the desired product, and avoiding the production of undesired by-products. This step of the reaction may be performed by using triphenylphosphine in combination with diethyl azodicarboxylate (DEAD), diisopropyl azodicarboxylate (DIAD), dibenzyl azodicarboxylate (DBAB) or di-(4-chlorobenzyl) azodicarboxylate (DCAD). Modified Mitsunobu catalysts such as tri-n-butylphosphine in combination with N,N,N',N'-tetramethylazodicarboxamide or 1,1'-(azodicarbonyl)dipiperidine may also be used. In some reactions, cyanomethylenetri-n-butylphosphorane alone can replace both triphenylphosphine and DEAD. Such a reaction would result in the formation of cyclodextrins with hydrophilic groups occupying at least one primary alcohol position, and hydrophobic groups occupying at least one secondary alcohol position.

The amphiphilic cyclodextrins disclosed herein may be incorporated in paints and coatings, providing a hydrophilic property to the paints. The hydrophobic side of the cyclodextrin may mix well with curing latex paint, thus becoming partially or fully trapped in the paint particles. The hydrophilic portion of the cyclodextrin would remain free to decorate the surface and the hydrophilic side-chains "fan out", forming a water-loving layer over the underlying acrylic surface. The extensive ether linkages present in the polyethylene glycol groups would be free to interact heavily with the water molecule, thus forming a hydrophilic surface.

The cyclodextrin additives disclosed herein may be dispersed in one or more organic binders, such as a polymeric organic binder. It is contemplated that any polymeric binder may be employed. In some embodiments, the polymeric binder is a water-dispersible polymer. The water-dispersible polymer may include, for example, a latex binder, such as natural latex, neoprene latex, nitrile latex, acrylic latex, vinyl acrylic latex, styrene acrylic latex, styrene butadiene latex, or the like. Compositions may also include a single binder or a mixture of two or more polymeric binders that may be of the same class or different classes. For example, organic binders may be combined with a silicon-based binder.

In some embodiments, the cyclodextrin additives may be dispersed in inorganic binders. Inorganic binders may include, without limitation, alkali metal silicates, such as potassium silicate, sodium silicate, lithium silicate, or the like.

The cyclodextrin additives may be added to a paint composition during any step of the paint preparation or before a consumer uses the paint. The cyclodextrin additives may be present as a separate component or a kit, and mixed with the paint before use. For example, the end consumer may add the cyclodextrin additive to any conventional paint formulation before use.

The cyclodextrin additives may be present in a paint formulation at about 0.5 to about 40 weight percent, at about 0.5 to about 20 weight percent, at about 0.5 to about 10 weight percent, at about 0.5 to about 5 weight percent, or at about 0.5 to about 1 weight percent. Additional specific examples include about 0.5 weight percent, about 0.7 weight percent, about 1 weight percent, about 2 weight percent, about 5 weight percent, about 10 weight percent, about 15 weight percent, about 30 weight percent, about 40 weight percent of the total weight, and ranges between any two of these values (including the endpoints).

Paints and coatings may contain one or more additives in their composition. These additives may alter one or more of the properties of the paint, such as shelf life, application, longevity, and health and safety. Such additives may be added, for example, during the manufacture of the emulsion polymer or during the formulation of the paint itself. Additives include, but are not limited to, initiators, rheology modifiers, preservatives, coalescing agents, and the like. Initiators are a source of free radicals to initiate the polymerization process in which monomers condense to form the polymers. Coatings may contain a redox system initiator, such as ferrous and thiosulfate salts along with the persulfate salts, that promote polymerization at room temperature.

Thickeners and rheology modifiers may also be added to coatings to achieve the desired viscosity and flow properties. Thickeners function by, for example, forming multiple hydrogen bonds with the acrylic polymers, thereby causing chain entanglement, looping and/or swelling which results in volume restriction. Thickeners, such as cellulose derivatives including hydroxyethyl cellulose, methyl cellulose and carboxymethyl cellulose, may be used in the compositions.

One or more preservatives may be added in the coating compositions in low doses to protect against the growth of microorganisms. Preservatives, such as methyl benzisothiazolinones, chloromethylisothiazolinones, barium metaborate and 1-(3-chloroallyl)-3,5,7-triaza-1-azoniaadamantane chloride, may be used.

Coalescing agents, such as ester alcohols, benzoate ethers, glycol ethers, glycol ether esters and n-methyl-2-pyrrolidone, may be added to the coating compositions. Coalescing agents are added to, for example, ensure film formation under varying atmospheric conditions. They may be slow evaporating solvents with some solubility in the polymer phase. They may also act as a temporary plasticizer, allowing film formation at temperatures below the system's glass transition temperature. After film formation, the coalescing agents may slowly diffuse to the surface and evaporate, increasing the hardness and block resistance of the film.

Coatings may further contain one or more of the following additives: solvents, pigments, plasticizers, surfactants, and the like. Surfactants may be used, for example, to create the micelles for particle formation, as well as long-term particle stabilization and these provide stability through electrostatic and steric hindrance mechanisms. Both ionic and non-ionic surfactants may be used. Examples may include, but are not limited to, alkyl phenol ethoxylates, sodium lauryl sulfate, dodecylbenzene sulfonate, polyoxyethylene alkyl ethers, polyoxyethylene alkyl allyl ethers, acetylene glycols, polyoxyethylene, stearic acid and polyoxypropylene.

One or more plasticizers may be added to the compositions to adjust the tensile properties of the paint film. Plasticizers include, for example, a glucose-based derivative, a glycerine-based derivative, propylene glycol, ethylene glycol, phthalates and the like.

Paints may further include one or more pigments. The term "pigments" is intended to embrace, without limitation, pigmentary compounds employed as colorants, including white pigments, as well as ingredients commonly known in the art as "opacifying agents" and "fillers". Pigments may be any particulate organic or inorganic compound and may provide coatings the ability to obscure a background of contrasting color (hiding power).

The coating of the present disclosure may be a decorative coating, an industrial coating, a protective coating, or a self-cleaning coating, or any combination thereof. The coating of the present disclosure may generally be applied to any substrate. The substrate may be an article, an object, a vehicle, or a structure. Although no particular limitation is imposed on the substrate to be used in the present disclosure, exemplary substrates include, an exterior of a building, vehicles, bridges, airplanes, metal railings, fence, glasses, plastics, metals, ceramics, wood, stones, cement, fabric, paper, leather, and combinations or laminations thereof may be used. The coating may be applied to a substrate by spraying, dipping, rolling, brushing, or any combination thereof.

One function of an exemplary coating embodiment may be summarized as follows: during the curing of the paint, the hydrophobic side chains of the cyclodextrins may easily become entrapped/embedded in the cured hydrophobic latex acrylic. As the paint cures and the water solvent evaporates, the latex particles may fuse together to form the finished paint, with the hydrophilic end of the cyclodextrin "brushing" out from the surface of the paint surface. This hydrophilic region on the surface of the paint allows the incoming water droplets to spread out and prevent beading, promoting a "self-cleaning" action. The resulting paint may keep painted objects clean with little external maintenance, by relying on the force generated by natural rainfall or by simple rinsing with water. Exterior surfaces such as buildings and monuments which are currently difficult to maintain will especially benefit from this technology and save maintenance costs.

EXAMPLES

Example 1

Preparation of Modified Cyclodextrin

Step 1: Anhydrous beta cyclodextrin (5.00 g, 4.41 mmol) is dissolved in 40 ml of dry pyridine. To this solution, trityl chloride (8.60 g, 30.8 mmol) is added and the mixture is stirred at 80° C. for 24 hours. The reaction is continued for 9 days with the addition of trityl chloride (1.08 g, 4.41 mmol) each day. The total amount of trityl chloride added is 70.5 mmol (16.0 equivalents). At the end of this period, the product formed is analyzed by a thin-layer chromatography ($R_f$=0.32, dichloromethane:methanol:water ratio 85:15:1.5). The reaction mixture is then added slowly to 1000 mL of water with stirring, resulting in immediate precipitation of a solid. The precipitate is collected by filtration, washed twice with 200 mL water (each time), and dried under vacuum. The resulting product is per-6-O-triphenylmethyl-beta-cyclodextrin.

Step 2: The above product (1.03 g, 0.36 mmol) is dissolved in anhydrous dimethyl formamide (10 mL). To this solution, sodium hydride (60% dispersion in mineral oil, 407 mg, 10.2 mmol) is added slowly, and the mixture is stirred at room temperature for five minutes. At the end of this period, the mixture is cooled to 0° C. using an ice bath. To this cold solution, 1-bromoheptadecane (2.41 g, 7.56 mmol) is added dropwise. The reaction is continued for 3 hours with constant stirring, followed by addition of methanol (3 mL) to quench the unreacted sodium hydride. The reaction mixture is then diluted with water (100 mL), and the mixture is extracted with ethyl acetate (100 ml). The organic solution is dried over anhydrous magnesium sulfate, and the solvent is evaporated under reduced pressure. The product obtained is a protected/alkylated beta-cyclodextrin.

Step 3: About 1 mmol of the above product is dissolved in a 2:1 mixture of dichloromethane-methanol (25 mL). The mixture is stirred at room temperature, and an aqueous solution of 50% fluoroboric acid is added dropwise over 30 minutes. The reaction mixture is further stirred at room temperature for three hours, and at the end of this period the pH of the mixture is measured, and if required, adjusted to between 7 and 8 by adding few drops of concentrated ammonium hydroxide. The solution is then evaporated under reduced pressure, and the residue is recrystallized.

Step 4: The final step of the reaction is carried out by the Mitsunobu coupling step, by using a slight stoichiometric excess (1.05 moles per mole of alcohol group being substituted) of triphenylphosphine and DEAD dissolved in dry dichloromethane at 0° C. With continued stirring, an equimolar amount of the mono-functional (alkyl-capped) polyethylene glycol oligomer is added dropwise to the above mixture. This is followed by addition of cyclodextrin product from step 3 dissolved in dry dichloromethane. The temperature of the reaction is maintained at 0° C. throughout the period, with constant stirring. At the end of 2 hours, the reaction mixture is allowed to warm to room temperature, and the mixture is quenched by the addition of ethanol. The alcohol layer containing the desired product is decanted away from the precipitated solids, and flushed through a small filter pad of silica gel using ethanol as the eluent. The combined alcohol fractions are then evaporated under reduced pressure to yield beta cyclodextrin with heptadecane groups occupying the secondary hydroxyl positions, and polyethylene glycol groups occupying the primary hydroxyl positions.

Example 2

Preparation of a Hydrophilic Coating Containing a Cyclodextrin

A hydrophilic coating is prepared having the following components: 40 grams of chromium oxide pigment, 2 grams of cyclodextrin compound (from Example 1), 2 grams of thickener (hydroxyethyl cellulose), 150 grams of solvent (water), 70 grams of binder (methyl methacrylate), 0.3 grams of coalescing agent (2,2,4-trimethyl-1,3-pentanediolmono (2-methylpropanoate)), and 0.05 grams of bactericide. The components are mixed under high shear for 30 minutes.

Example 3

Preparation of a Hydrophilic Coating without Cyclodextrin

A hydrophilic coating is prepared having the following components: 40 grams of chromium oxide pigment, 2 grams of thickener (hydroxyethyl cellulose), 150 grams of solvent (water), 70 grams of binder (methyl methacrylate), 0.3 grams of coalescing agent (2,2,4-trimethyl-1,3-pentanediolmono (2-methylpropanoate)), and 0.05 grams of bactericide. The components are mixed under high shear for 30 minutes.

Example 4

Evaluation of Hydrophilic Property

The hydrophilic coating of Example 2 is coated on a glass surface and dried at room temperature. The surface free energy and the water droplet contact angle of the hydrophilic coating is measured as follows. A Zisman plotting method is employed for measuring the surface free energy. The surface tension of various concentrations of the aqueous solution of magnesium chloride is plotted along the X-axis, and the contact angle in terms of cos θ is plotted along the Y-axis. A graph with a linear relationship between the two is obtained. The graph is extrapolated such that the surface tension at contact angle 0° is measured and is defined as the surface free energy of the solid. The surface free energy of the glass surface measured will be 85 milliNewton/meter.

Example 5

An Object Coated with Hydrophilic Paint

A metal table is painted with a hydrophilic coating containing cyclodextrin additives (Example 1) and is allowed to dry at room temperature. The surface free energy of the chair is measured as explained in Example 4 and will be 85 milliNewton/meter. The anti-fouling property of the coating is measured as follows: A line is drawn on the above mentioned coated table using oily ink. A similar line is also drawn on a table which is coated with a paint without cyclodextrin (Example 3). An uncoated table is also used in this experiment. A water jet is continuously applied on all the three surfaces and periodically checked whether the oily line is erased. The oily ink applied on the coated table will be erased after 1 minute, whereas the oily line on the un-coated table or on the table with a paint lacking cyclodextrin will be un-changed and visible.

Example 6

Anti-Fouling Properties

The procedure involves three concrete surfaces, coating one concrete surface with a hydrophilic paint with cyclodextrin additives (Example 1), coating the second concrete surface with a paint without cyclodextrins (Example 3), and the third concrete surface without any coating. After drying the paint, all the three surfaces are exposed to running water for one month. At the end of the period, the concrete surface is checked for visible peeling of the paint and growth of organisms such as algae. The concrete surface coated with the hydrophilic paint containing cyclodextrins will be clear of microorganisms and algae, whereas the other two concrete surfaces will exhibit the growth of microorganisms.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases at least one and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A hydrophilic coating composition comprising:
at least one binder; and
a coating additive which is at least one cyclodextrin compound having formula I:

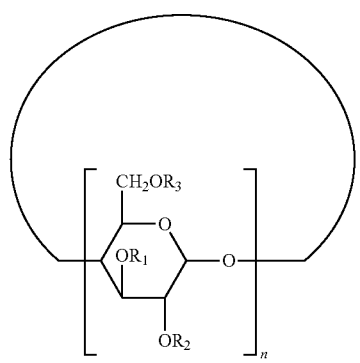

wherein:
each $R_1$ is, independently, a hydrophobic group or H, where the hydrophobic group is selected from alkenyl, alkynyl, haloalkyl, cycloalkyl, aryl, and any combination thereof, and wherein at least one $R_1$ is a hydrophobic group;
each $R_2$ is, independently, a hydrophobic group or H, where the hydrophobic group is selected from alkenyl, alkynyl, haloalkyl, cycloalkyl, aryl, and any combination thereof, and wherein at least one $R_2$ is a hydrophobic group;
each $R_3$ is, independently, a hydrophilic group or H, where the hydrophilic group is selected from an amine, an amide, an epoxide, a lactone, a carboxyl, a carbonyl, and any combination thereof, and wherein at least one $R_3$ is a hydrophilic group; and
n is 6, 7, or 8.

2. The composition of claim 1, wherein the binder comprises one or more silicone polymers or one or more organic polymers, or any combination thereof.

3. The composition of claim 1, wherein the cyclodextrin compound is present in about 0.5 weight percent to about 40 weight percent of the total coating composition.

4. The composition of claim 1, further comprising one or more of a solvent, a coalescing agent, a pigment, a rheology modifier, a plasticizer, and a surfactant.

5. The composition of claim 1, wherein the coating composition is a decorative coating, an industrial coating, a protective coating, or a self-cleaning coating, or any combination thereof.

6. The composition of claim 1, wherein the binder comprises inorganic binder selected from potassium silicate, sodium silicate, lithium silicate, and any combination thereof.

7. The composition of claim 1, wherein each $R_1$ is independently aryl or haloalkyl.

8. The composition of claim 1, wherein each $R_2$ is independently aryl or haloalkyl.

9. The composition of claim 1, wherein each $R_3$ is independently carboxyl or epoxide.

10. The composition of claim 1, wherein each $R_1$ is alkenyl, each $R_2$ is alkenyl, and each $R_3$ is an amine.

11. The composition of claim 1, wherein each $R_1$ is alkenyl, each $R_2$ is aryl, and each $R_3$ is an epoxide.

12. A method of coating a substrate, the method comprising:
applying a coating composition to the substrate, wherein the coating composition comprises at least one cyclodextrin compound of formula I:

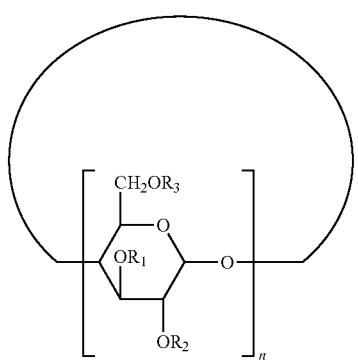

wherein:
each $R_1$ is, independently, a hydrophobic group or H, where the hydrophobic group is selected from alkenyl, alkynyl, haloalkyl, cycloalkyl, aryl, and any combination thereof, and wherein at least one $R_1$ is a hydrophobic group;

each $R_2$ is, independently, a hydrophobic group or H, where the hydrophobic group is selected from alkenyl, alkynyl, haloalkyl, cycloalkyl, aryl, and any combination thereof, and wherein at least one $R_2$ is a hydrophobic group;

each $R_3$ is, independently, a hydrophilic group or H, where the hydrophilic group is selected from an amine, an amide, an epoxide, a lactone, a carboxyl, a carbonyl, and any combination thereof, and wherein at least one $R_3$ is a hydrophilic group; and n is 6, 7, or 8.

13. The method of claim 12, wherein applying the coating comprises applying a coating composition having the cyclodextrin compound in about 0.5 weight percent to about 40 weight percent of the total coating composition.

14. The method of claim 12, wherein applying the coating comprises applying a coating composition further comprising one or more of a binder, a solvent, a coalescing agent, a pigment, a rheology modifier, a plasticizer, and a surfactant.

15. The method of claim 12, wherein applying the coating comprises coating, brushing, dipping, spraying, rolling, or any combination thereof.

* * * * *

UNITED STATES PATENT AND TRADEMARK OFFICE
CERTIFICATE OF CORRECTION

| | | |
|---|---|---|
| PATENT NO. | : 9,051,479 B2 | |
| APPLICATION NO. | : 13/879941 | |
| DATED | : June 9, 2015 | |
| INVENTOR(S) | : Brizius | |

It is certified that error appears in the above-identified patent and that said Letters Patent is hereby corrected as shown below:

In the specification,

In Column 12, Lines 43-44, delete "at least one" and insert -- "at least one" --, therefor.

Signed and Sealed this
Twenty-fourth Day of November, 2015

Michelle K. Lee
*Director of the United States Patent and Trademark Office*